March 24, 1959 — G. H. BUDGE ET AL — 2,878,838
SHEET METAL TAKE-OFF PIPE FITTING
Filed Feb. 13, 1956
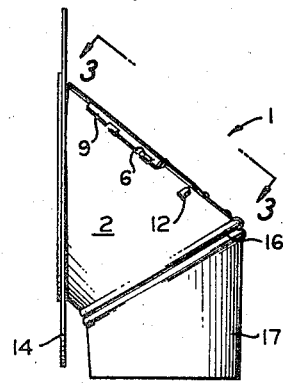
FIG_1
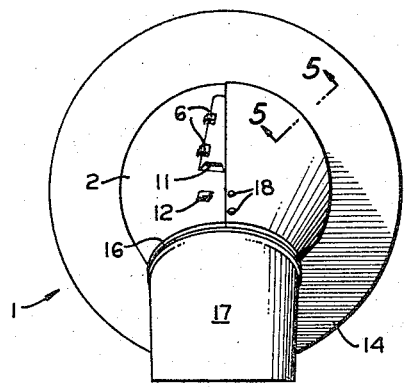
FIG_2
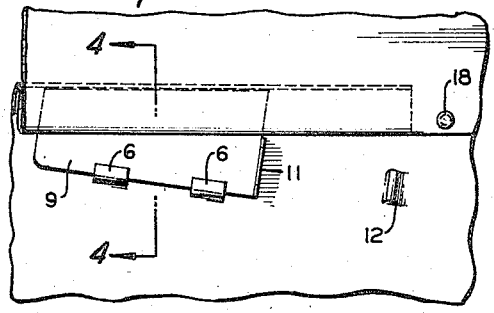
FIG_3
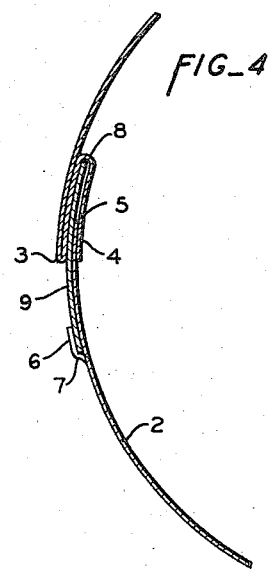
FIG_4
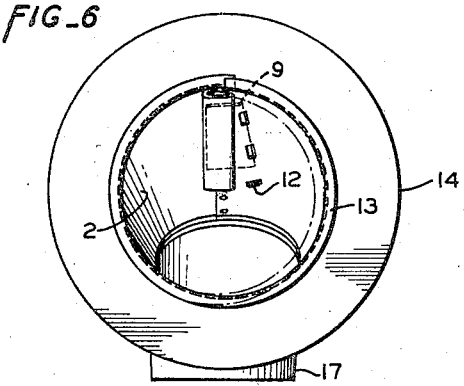
FIG_6
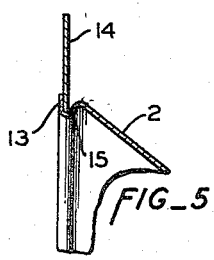
FIG_5
INVENTORS
GEORGE H. BUDGE
CLIFFORD A. ODERMATT
BY
ATTORNEYS

United States Patent Office 2,878,838
Patented Mar. 24, 1959

2,878,838

SHEET METAL TAKE-OFF PIPE FITTING

George H. Budge, and Clifford A. Odermatt, Castro Valley, Calif., assignors to United Products Co., Oakland, Calif., a corporation of California Application February 13, 1956, Serial No. 565,076

4 Claims. (Cl. 138—74)

This invention relates to and in general has for its object the provision of a sheet metal pipe fitting.

Currently, in making a connection between a take-off pipe fitting and a duct or plenum chamber it is necessary to resort to the practice of swaging the fitting to the duct or chamber, and normally this has to be done in the field by a skilled artisan.

Therefore, one of the principal objects of this invention is the provision of a preformed or preswaged fitting provided with readily operated locking means for locking the fitting to a duct, plenum chamber, or the like.

More specifically, this invention has for its object the provision of a take-off sheet metal pipe fitting, including a metal sheet formed into a collar by a seam wherein one edge of said sheet is receivable in a first outwardly facing channel provided in the opposed edge of said sheet, wherein said sheet is provided along its said one edge with an opposed outwardly offset channel, wherein a wedge is receivable along its opposed edges in said two channels thereby to bias the two edges of said sheet away from each other, and wherein one end of said collar is provided with an outwardly facing peripheral or circumferential channel for the reception of a circumscribing wall of a duct or plenum chamber.

The invention possesses other advantageous features, some of which, with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

Referring to the drawings:

Fig. 1 is a side elevation of a sheet metal take-off pipe fitting embodying the objects of our invention.

Fig. 2 is a front elevation of said fitting.

Fig. 3 is a fragmentary top plan view taken along the line 3—3 of Fig. 1.

Fig. 4 is an enlarged transverse section taken on the section line 4—4 of Fig. 3.

Fig. 5 is a fragmentary section taken on the section line 5—5 of Fig. 2.

Fig. 6 is a rear elevation of said fitting.

As shown in these various figures, the objects of our invention have been embodied in a sheet metal take-off pipe fitting generally referred to by the reference numeral 1, and including a collar 2.

Formed on one edge 3 of the collar 2, on the inner side thereof, is an outwardly facing channel 4 for the loose reception of the opposite plain edge 5 of the collar 2, or more specifically, of the metal sheet from which the collar is made. Struck up from the collar adjacent the edge 5 is a plurality of outwardly offset lugs or fingers 6 individually or collectively serving as a channel opposed to the channel 4. Preferably, the side walls 7 of the fingers 6 are aligned with each other, but inclined relative to the side wall 8 of the channel 4.

Receivable in the two opposed inclined channels so formed is a sheet metal wedge 9 contoured to snugly engage the adjacent wall of the collar 2. The inclination of the opposed edges of the wedge 9 should of course be substantially equal to the inclination of the side walls of the opposed channels so as to be snugly receivable therein. Here it should be noted that the width of the channel 4 should be sufficient to receive the wedge 9, as well as the edge 5 of the collar 2 with a slight degree of friction so that a fairly tight joint between the two overlapping edges of the collar will obtain. By retracting the wedge 9, the collar can be contracted to a minimum diameter and then expanded to a maximum diameter by advancing the wedge. For convenience in operating the wedge, its large end is formed with an outwardly extending flange or finger hold, and to limit its outer movement a lug 12 is struck outwardly from the collar in line with the wedge.

Formed on one end of the collar 2 is an inwardly indented, outwardly facing peripheral or circumferential channel 13 for the reception of the circumscribing edge of a duct or plenum chamber 14. Illustrated in Figs. 1, 2, and 6, is an annular ring which can be attached to a duct or plenum chamber, and therefore considered as an integral part thereof. Formed in the duct or plenum chamber is a circular opening 15 of a diameter intermediate the maximum and minimum diameters of the adjacent end of the collar 2. As a result of this construction, the collar 2 when contracted to its minimum diameter can be inserted into the circular opening 15 of the plenum chamber or duct 14 with its channel 13 coplanar with the chamber wall. By then advancing the wedge 9, and thus expanding the collar, its channel 13 will be forced into stradding or seating engagement with the circumscribing walls of the duct or plenum chamber.

Formed on the opposite end of the collar 2 is an outwardly indented, inwardly facing, peripheral channel 16 arranged to receive a complementary bead or flange formed on the end of an adjoining pipe section 17. Securing the overlapping edges of this end of the collar is a pair of rivets 18. Since the wedge 9 and its associated parts are substantially spaced from the rivets 18, the presence of these rivets in no way prevents the expansion and contraction of the plenum end of the collar, at least, for the purpose of making the connection above described between these two members.

We claim:

1. A sheet metal take-off pipe fitting comprising: a metal sheet formed into a collar by a seam, wherein one edge of said sheet is receivable in a first outwardly facing channel formed in the opposed edge of said sheet; an opposed and outwardly offset second channel formed in said sheet adjacent its said one edge; and a wedge receivable along its edges in said opposed channels, said wedge serving to bias the two said edges of said sheet away from each other.

2. A sheet metal take-off pipe fitting such as defined in claim 1, wherein the side wall of said second channel is inclined relative to the side wall of said first channel.

3. A sheet metal take-off pipe fitting such as defined in claim 1, wherein one end of said collar is provided with an outwardly facing circumferential channel.

4. A sheet metal take-off pipe fitting such as defined in claim 1, wherein one end of said collar is provided with an inwardly indented, outwardly facing, circumferential channel.

(References on following page)

References Cited in the file of this patent

UNITED STATES PATENTS

| | | |
|---|---|---|
| 414,200 | Elliott | Nov. 5, 1889 |
| 864,034 | Rudderow | Aug. 20, 1907 |
| 997,072 | Mares | July 4, 1911 |
| 2,463,593 | Boardman | Mar. 8, 1949 |
| 2,650,115 | Taylor | Aug. 25, 1953 |
| 2,703,110 | Curtis | Mar. 1, 1955 |
| 2,752,950 | Coulters | July 3, 1956 |

FOREIGN PATENTS

| | | |
|---|---|---|
| 281,540 | Germany | Jan. 15, 1914 |